June 4, 1968   H. H. HOLLY   3,386,129
MOLDING APPARATUS WITH AIR RELIEF
Filed Oct. 29, 1965   2 Sheets-Sheet 1
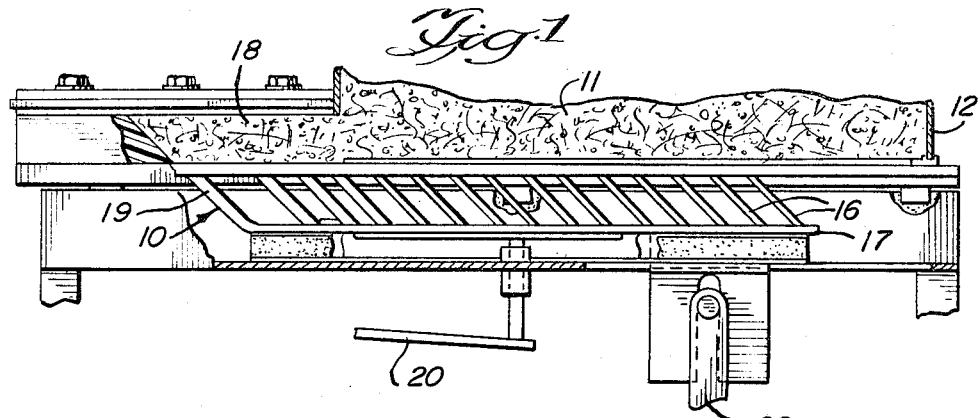
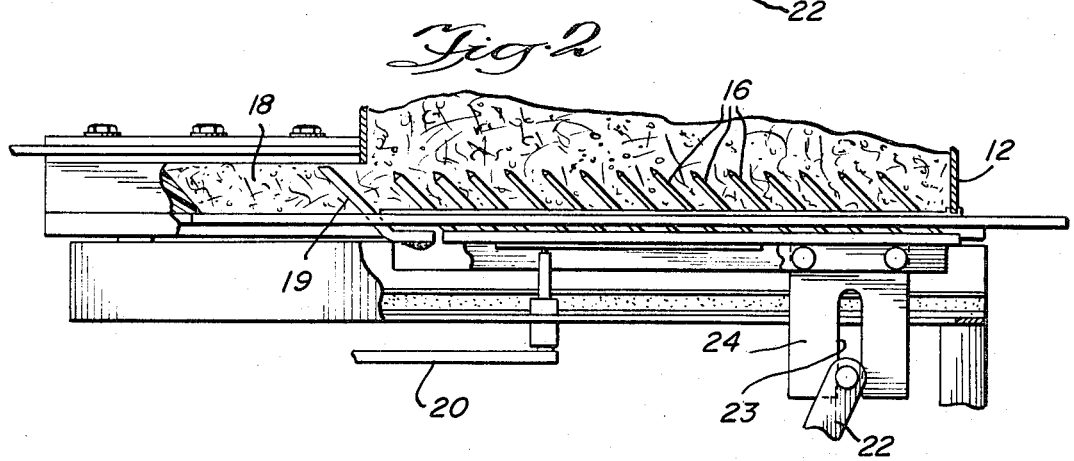
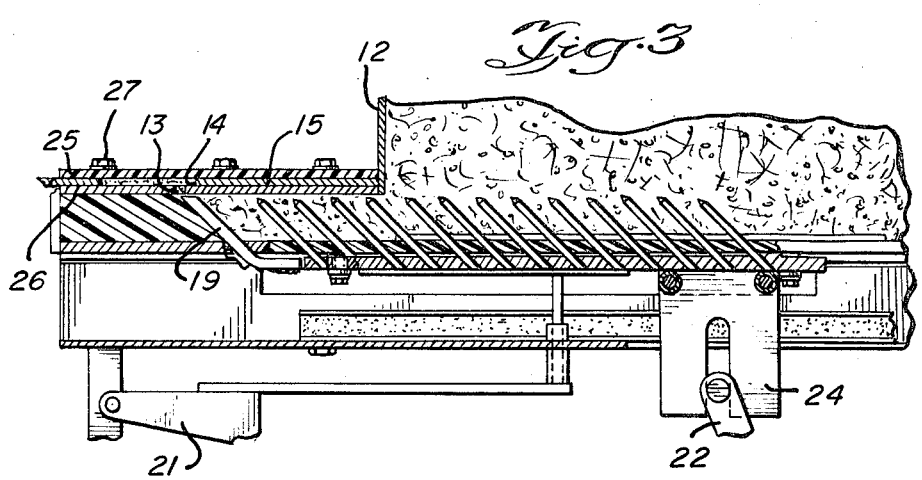
INVENTOR
Harry H. Holly
BY Hofgren, Wegner, Allen, Stellman & McCord
ATTORNEYS

United States Patent Office 3,386,129
Patented June 4, 1968

3,386,129
MOLDING APPARATUS WITH AIR RELIEF
Harry H. Holly, Olympia Fields, Ill., assignor to Hollymatic Corporation, a corporation of Illinois
Filed Oct. 29, 1965, Ser. No. 505,697
2 Claims. (Cl. 17—32)

ABSTRACT OF THE DISCLOSURE

A device for molding successive articles of a plastic material such as molding meat patties from ground meat in which the meat or similar material is injected into a mold that is movable and with the mold having air vents communicating therewith together with a particle severing edge on the mold that will sever particles of the meat or similar material retained in the vent passage inner ends when the mold is moved to discharge position.

---

This invention relates to a molding apparatus for comminuted plastic material such as for molding patties from ground meat, fish and other food products.

Molding apparatus of this type that have been proposed in the past have employed movable molds having mold openings therein. One such apparatus is disclosed and claimed in my prior Patent 3,061,872 as well as my other prior patents of which Patent 2,706,830 is an example.

In my copending Patent 3,293,688 issued Dec. 27, 1966, there is disclosed and claimed a molding apparatus of the same general type in which there is a supply means for providing a supply of plastic material having an exit opening from the supply means through which the plastic material may be forced, feeder means for moving the plastic material to and through the exist opening, a mold such as a reciprocable mold plate having a mold opening therein communicating with the exit opening to receive plastic material therethrough and sealing means such as upper and lower plates between which the mold plate is reciprocated for closing the sides of the mold except for the portion coinciding with the exit opening through which the plastic material is moved into the mold opening.

One of the features of this invention is to provide means forming a plurality of air escape openings in the sealing means communicating with the mold opening at an area spaced from the exit opening during the time when the plastic material is forced through the exit opening into the mold opening in order that entrapped air may escape through these escape openings, the air escape openings being small in transverse dimensions and depth relative to the average size of the particles of the comminuted plastic material such as the particles and fibers of the above exemplary ground meat, fish and other food products.

A further feature of the invention is to provide such a device in which the sealing means comprises side members on opposite sides of the slidable mold plate and with the air escape openings being located in a thin section in one of the side members, the thin section being located adjacent the mold.

Other features and advantages of the invention will be apparent from the following description of certain embodiments thereof taken in conjunction with the accompanying drawings. Of the drawings:

FIGURE 1 is a fragmentary, side elevational view, partially in section, of a molding device similar to the one disclosed more fully in the above copending application 422,672 and embodying the invention.

FIGURE 2 is a view similar to FIGURE 1 but showing the feeder means in position remote from the mold opening preparatory to filling the opening in the mold plate.

FIGURE 3 is a view similar to FIGURES 1 and 2 and showing the position of the feeder means at the end of its feeding movement.

Figure 4:
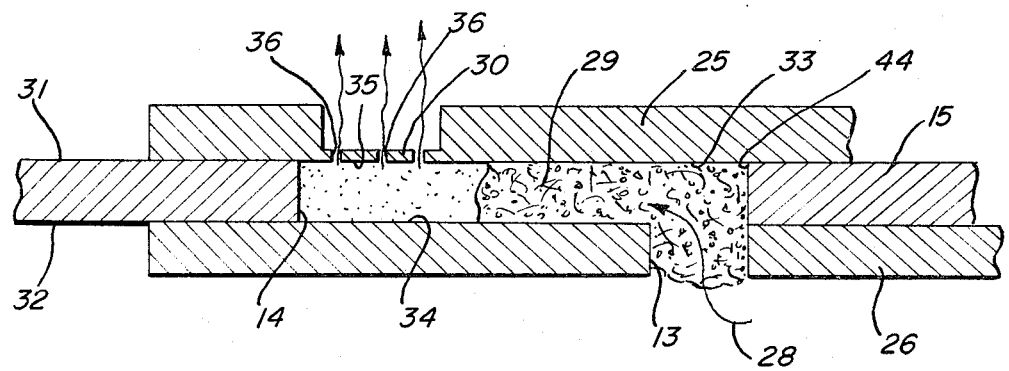
FIGURE 4 is a semi-diagrammatic detailed fragmentary sectional view illustrating the location and operation of one embodiment of air escape means.

As is explained in the above copending patent, feeder means 10 are employed to move the plastic material such as the ground meat 11 from a supply means such as a supply hopper 12 through an exit opening 13 leading from the supply means into a mold opening 14 in a reciprocable mold plate 15.

In the accompanying drawings only enough of the molding apparatus structure is shown to illustrate the invention. Thus, the feeder means 10 as is explained in detail in the above copending application is essentially a four motion feeder means that comprises forwardly sloped spaced pins 16 mounted on a bottom plate 17 and sloped forwardly toward the front of the supply hopper 12 that includes the forwardly extending passage means or tunnel 18. At the front of the plate 17 forwardly of the pin 16 there is provided a forwardly sloped feeder bar 19 that extends, when in the feeding positions of FIGURES 2 and 3, substantially completely across the generally rectangular cross sectioned passage means 18.

In the first of the four motions, the feeder means 10 is lowered to the position shown in FIGURE 1 where it is beneath the supply hopper 12 by lowering a lever 20 such as with a cam (not shown) operating on a cam follower 21. Then, in the second motion, the feeder means 10 is retracted to a position below the hopper 12 and below its position shown in FIGURE 2. In the third motion, it is raised to the position shown in FIGURE 2 by the lever 20 where the pins 16 and feeder bar 19 are within the bottom of the hopper 12 and the feeder bar 19 is at the rear of the passage means 18. Then, in the fourth motion, the feeder means 10 is moved forwardly by a lever 22 engaging a slot 23 in a downwardly extending drive bar 24 so that the feeder bar 19 will force the comminuted plastic material such as the ground meat forwardly in the passage means 18 and through the exit opening 13 into the mold opening 14.

As is shown most clearly in FIGURES 3 and 4, the mold plate 15 is reciprocated between plates 25 and 26 with these two plates held in this assembled relationship by spaced bolts 27. As is true in apparatus of this type, the reciprocating movement of the mold plate 15 is in timed relationship to the movement of the feeder means 10 so that the feeder means moves forwardly to coincide with the time the mold opening 14 is in communication with the exit opening 13 from the supply means, here exemplified in the hopper 12 and passage means 18. When this occurs, the plastic material such as the meat is forced in the direction illustrated by the arrow 28 in FIGURE 4 upwardly through the exit openings 13 into the mold openings 14 to form the molded article or meat patty 29.

All of the structure disclosed and described is a part of the entire apparatus disclosed and claimed in the above-mentioned Patent 3,293,688. The present invention is concerned with means providing for escape of entrapped air from within the mold opening 14 during the filling operation. In the embodiment illustrated in FIGURE 4 this air escape means comprises a thin section 30 in the top plate 25 with this thin section being adjacent the mold plate 15. As is illustrated, the mold plate 15 is provided with top and bottom substantially parallel surfaces 31 and 32 between which the mold opening 14 extends with the plate being slidable between the plates 25 and 26 which have substantially parallel surfaces 33 and 34 engaging and providing bearing surfaces for the top and bottom surfaces 31 and 32 of the mold plate. The thin section 30 has its inner surface 35 coplanar with the surrounding surface 33 of the plate 25.

In order to provide for the escape of air there are located in the thin section 30 a plurality of extremely small openings 36. These openings 36 are shown in FIGURE 4 in exaggerated detail for illustraitve purposes. Actually, the openings are small in transverse dimension and vertical depth (provided by the thinness of the section 30) relative to the average size of the particles of comminuted material such as the ground meat, fish or other food product. Thus, in one embodiment the plate section 30 is only 1/22 inch thick which of course determines the depth of each opening 36 and each opening was only .022 inch in diameter.

Figure 5:
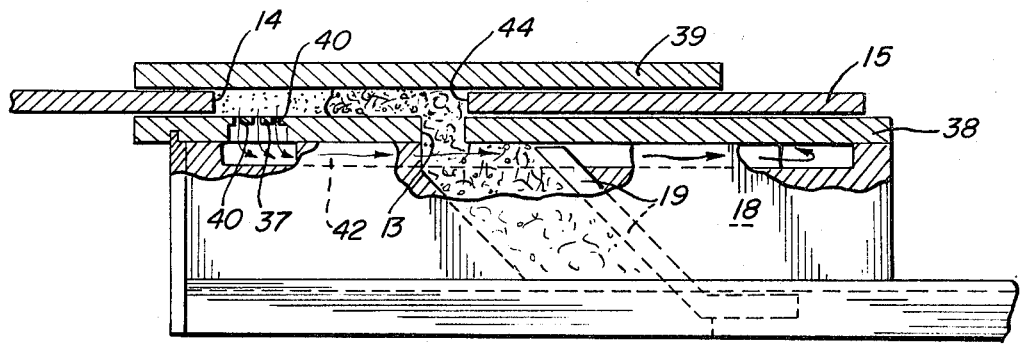
FIGURE 5 is a view similar to FIGURE 4 but illustrating a second embodiment of the air escape means.
Figure 6:
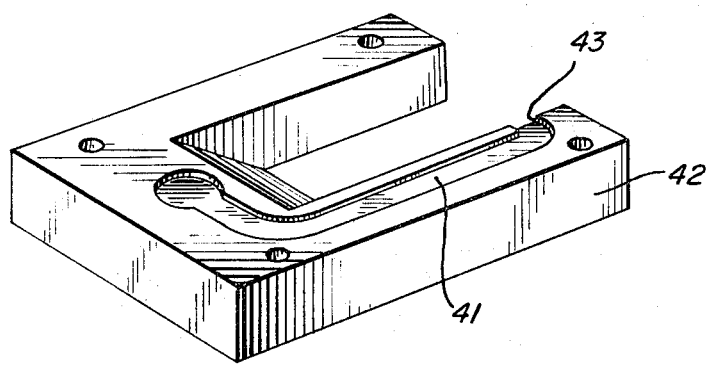
FIGURE 6 is a detailed perspective view of a portion of the second embodiment of FIGURE 5.

As is illustrated in FIGURE 4, the air forced from the mold opening 14 by the entering plastic material forces air out through the openings 36 into the atmosphere. In the embodiment of FIGURES 5 and 6 this air instead of being vented to the atmosphere is directed back to the supply means, here the passage means 18 rearwardly of the feeder means 10 and specifically the feeder bar 19.

Thus, in this embodiment the thin section 37 is in the bottom supporting plate 38 instead of the top plate 39. The thin section 37 contains a similar plurality of air escape openings 40 as described above, but here the openings 40 lead to an air passage 41 in a bottom plate 42 that is located beneath the plate 38 on which the mold plate 15 reciprocates. As is shown most clearly in FIGURE 6, this passage has an exit 43 leading back to the supply means 18 rearwardly of the feeder bar 19. This arrangement for venting the air back to the supply means returns any fine particles, juices or the like to the supply means without wasting them.

The air exit openings of this invention are small in transverse dimensions and depth relative to the particles of the comminuted plastic material in order that the entrapped air can escape but not excessive amounts of the material such as the above-mentioned ground meat. Thus, only very small amounts of extremely fine plastic material can work outwardly through the openings but larger particles cannot. In the case of ground meat and other food products, some tissue will be partially caught in the openings. However, on each reciprocating movement of the mold plate 15 these will be sheared off by the top back corner 44 of the mold plate. For illustrative purposes there is shown in FIGURE 5 small spaces between mold plate 15 and the supporting plates 38 and 39. These spaces do not of course occur as the plate surfaces are flush against each other.

By providing the air escape openings less compressive force is necessary on the plastic material to fill the mold opening 14. Without the provision of these air escape openings air can only escape forwardly between the top and bottom of the mold plate 15 and the top and bottom supporting plates 25 and 26. Because the clearances here are very small such as .006 to .008 inch, the compressive forces generated are considerable. Where the plastic material is a sealing product such as the fat of ground meat, these clearance spaces become clogged with films of the plastic material so that tremendous compressive force is required to permit the air to escape. Frequently, the compressive force required is so great that not enough is available with the result that imperfectly formed patties 29 are produced containing insufficient quantities of plastic material. In addition, the air relief openings provide for a cleaner running mold plate. Thus, in the case of meat there is less accumulation of meat and fat film on the top and bottom of the mold plate with the result that less is sheared off during reciprocation of the mold plate, thereby preventing a messy and wasteful operation.

Another very important advantage in the device of this invention is that the fibers of ground meat are more easily arranged haphazardly in the shaped patty so that subsequent cooking causes substantially uniform shrinkage in all directions with the result that the cooked patty has substantially the same shape as the original molded patty. Thus, one of the important ways of preventing non-uniform shrinkage is to apply compressive force to the plastic material with the feeder means 19 before the mold opening 14 is moved into register with the exit opening 13 so that the ground meat "explodes" into the mold opening 14. This prevents fibers of meat aligning themselves predominantly in the direction of flow indicated by the arrow 28 and forces them to be extended haphazardly. By providing the exit openings 36 and 40 for the air, the explosive filling of the mold opening 14 is accomplished almost immediately when the mold opening 14 first registers with the exit opening 13. Thus, because the air can escape very rapidly the plastic material flows in to fill the mold opening while the access opening thereto is very small.

Having described my invention as related to the embodiments shown in the accompanying drawings, it is my intention that the invention be not limited by any of the details of description, unless otherwise specified, but rather be construed broadly within its spirit and scope as set out in the accompanying claims.

I claim:

1. In a device for molding successive articles of plastic material that includes small particles of said material, and for removing said articles, apparatus comprising: a movable mold having a mold opening therein exposed through a side of said mold; means for filling said opening with plastic material under pressure; a closure member having a surface against which said mold side bears during said filling to provide a closure for said mold opening during said filling, said mold opening adjacent said closure member having a sharp, particle severing edge; means in said closure member surface forming a plurality of air escape vent passages having inner ends at said surface to vent air from said mold opening during said filling; and means for moving said mold relative to said closure member surface preparatory to said removing, said severing edge thereby severing any of said particles retained in said vent passage inner ends.

2. The apparatus of claim 1 wherein said vent passages are located in a section of said closure member that is thin relative to the rest of the closure member.

References Cited
UNITED STATES PATENTS

| | | | |
|---|---|---|---|
| 2,729,947 | 1/1956 | Cheney | 17—32 |
| 2,987,819 | 6/1961 | Miller et al. | 31—8 |
| 3,008,235 | 11/1961 | Royer et al. | 17—32 X |
| 3,137,029 | 6/1964 | De Zolt | 17—32 |
| 3,160,928 | 12/1964 | Smillie. | |
| 3,293,688 | 12/1966 | Holly | 17—32 |

LUCIE H. LAUDENSLAGER, *Primary Examiner.*